United States Patent
Nelson et al.

[11] Patent Number: 5,421,418
[45] Date of Patent: Jun. 6, 1995

[54] APPARATUS AND METHOD FOR MIXING POLYACRYLAMIDE WITH BRINE IN AN ANNULUS OF A WELLBORE TO PREVENT A CEMENT-LIKE MIXTURE FROM FOULING WELLBORE TOOLS

[75] Inventors: Erik B. Nelson, Broken Arrow, Okla.; Clifford L. Aseltine, Houston; James E. Brooks, Manvel, both of Tex.

[73] Assignee: Schlumberger Technology Corporation, Houston, Tex.

[21] Appl. No.: 267,998

[22] Filed: Jun. 28, 1994

[51] Int. Cl.⁶ ............................................ E21B 43/117
[52] U.S. Cl. ........................................ 175/2; 166/293; 166/297; 166/300; 175/4.6
[58] Field of Search ............... 166/274, 275, 305.1, 166/293, 299, 300; 175/4.6, 2; 102/332, 331, 306–310

[56] References Cited

U.S. PATENT DOCUMENTS

| | | | |
|---|---|---|---|
| 3,909,423 | 9/1975 | Hessert et al. | 166/275 X |
| 4,060,490 | 11/1977 | Bernard | 166/274 X |
| 4,262,746 | 4/1981 | Hammett | 166/273 |
| 4,307,782 | 12/1981 | Schievelbein | 166/274 |
| 4,553,596 | 11/1985 | Graham et al. | 166/297 X |

Primary Examiner—Stephen J. Novosad
Attorney, Agent, or Firm—H. N. Garrana; J. H. Bouchard

[57] ABSTRACT

Prior to pumping completion brine fluid into a wellbore, an additive comprising two percent (2%) of a 0.25% solution of polyacrylamide is blended into the completion brine fluid thereby producing a treated brine fluid. This blending would be performed in tanks at the wellsite. The treated brine fluid is then pumed into the wellbore. In addition, or in the alternative, a new perforating gun stores the polyacrylamide additive composition. When the perforating gun detonates, the additive is disbursed into the completion brine fluid disposed in the annulus of the wellbore. For example, the new perforating gun may include a plurality of shaped charges coated with a lacquer of the polyacrylamide additive, or it may include one or more containers which contain the polyacrylamide additive. When the brine completion fluid is pumped into the wellbore annulus, a detonation wave conducts in a detonating cord of the perforating gun. The detonation wave passes through each of the containers. As a result, the containers will rupture and the plurality of shaped charges will detonate. Since the containers each ruptured, the polyacrylamide additive composition from the containers will be disbursed into the brine completion fluid in the annulus. In addition, or in the alternative, since the shaped charges of the new perforating gun were coated with a lacquer of the polyacrylamide composition, when the shaped charges detonated, the polyacrylamide composition on the zinc charge debris mixes with the brine fluid in the wellbore annulus. Zinc oxychloride hydrate debris is formed as a reaction product. However, the presence of the polyacrylamide additive in the zinc oxychloride hydrate debris will inhibit the formation of hardened chunks of a cement-like material in the annulus of the wellbore.

21 Claims, 1 Drawing Sheet

APPARATUS AND METHOD FOR MIXING POLYACRYLAMIDE WITH BRINE IN AN ANNULUS OF A WELLBORE TO PREVENT A CEMENT-LIKE MIXTURE FROM FOULING WELLBORE TOOLS

BACKGROUND OF THE INVENTION

The subject matter of the present invention relates to a method and an apparatus, adapted to be disposed in a wellbore, for mixing a polyacrylamide composition with a brine, located in an annulus of a wellbore, in order that a resultant zinc-oxychloride debris, formed from zinc charge debris and brine, will flocculate and assume the form of unconsolidated particles instead of large chunks and the rate at which a resultant cement-like mixture formed in the annulus of the wellbore will be decreased.

A perforating gun is connected to a tubing and lowered into a wellbore. The perforating gun includes a plurality of shaped charges, each shaped charge comprised of a zinc material. When the perforating gun is disposed in the wellbore, an annulus space is located between the perforating gun and a wall of the wellbore. A calcium chloride brine fluid is normally disposed within the annulus. When the plurality of zinc shaped charges of the perforating gun are detonated into the calcium chloride brine fluid in the annulus, zinc oxychloride hydrate debris is a reaction product. The tubing, to which the perforating gun is connected, sometimes includes a circulating valve and other well tools. If the circulating valve fails and the zinc oxychloride hydrate debris is not circulated out of the annulus quickly after its initial formation as a reaction product, the debris, being a cementitious material, will quickly form into a hardened cement-like material. Since the debris is now formed of a hardened material, when an attempt is made to remove the debris from the annulus, the hardened debris will subsequently foul the other well tools of the tubing, and, in general, it will be difficult to remove the hardened debris from the annulus of the wellbore. Therefore, an additive is needed, which is adapted to be added to the zinc oxychloride hydrate debris concurrently with or immediately following the detonation of the shaped charges of the perforating gun, which will decrease the rate at which such debris forms into the hardened cement-like material.

SUMMARY OF THE INVENTION

Accordingly, it is a primary object of the present invention to provide an additive composition which, when added to the zinc oxychloride hydrate debris formed as a result of a detonation of a perforating gun in a wellbore, will decrease the rate at which such debris is formed into a hardened cement-like material.

It is a further object of the present invention to provide a method and apparatus for disbursing the additive composition into a brine fluid which is disposed within an annulus in a wellbore.

It is a further object of the present invention to disburse the additive composition into the brine fluid before a detonation of a perforating gun in a wellbore by mixing the additive with the brine fluid prior to pumping the resultant mixture into the annulus of the wellbore.

It is a further object of the present invention to disburse the additive composition into the brine fluid concurrently with a detonation of the perforating gun in the wellbore by coating each of the plurality of shaped charges in the perforating gun with a lacquer containing the additive at the time of manufacture of the shaped charges, so that, when the charges detonate, the additive composition is disbursed into the brine fluid concurrently with the detonation of the shaped charges of the perforating gun.

It is a further object of the present invention to disburse the additive composition into the brine fluid immediately after a detonation of the perforating gun in the wellbore by incorporating into the perforating gun one or more sealed and pressure compensated containers where each container includes the additive composition and, immediately after the perforating gun detonates, the containers will rupture and the additive composition will be disbursed into the zinc oxychloride hydrate debris prior to the formation of such debris into the hardened cement-like material.

It is a further object of the present invention to provide a new perforating gun which includes an apparatus for storing or including the additive composition, the apparatus disbursing the additive composition into a brine fluid disposed in an annulus of the wellbore either during or immediately after detonation of the perforating gun.

It is a further object of the present invention to provide a new perforating gun adapted to be disposed in a wellbore including a shaped charge which is coated with a lacquer containing the additive composition, the additive composition in the lacquer disbursing into a brine fluid disposed in an annulus of the wellbore simultaneously with detonation of the shaped charge.

It is a further object of the present invention to provide a new perforating gun which includes a pressure compensated and sealed container which stores the additive composition, the container rupturing and disbursing the additive composition into the zinc oxychloride hydrate debris which is located in the annulus of the wellbore after the perforating gun detonates, the disbursement of the additive composition taking place prior to the formation of such debris into the hardened cement-like material.

In accordance with these and other objects of the present invention, in accordance with a preferred embodiment of the present invention, prior to pumping completion brine fluid into a wellbore, an additive comprising at least two percent (2%) of a 0.25% solution of polyacrylamide is blended into the completion brine fluid thereby producing a treated brine fluid. This blending would be performed in tanks at the wellsite. The treated brine fluid can stay in the wellbore indefinitely before perforation of the wellbore by a perforating gun. However, in accordance with another embodiment of the present invention, the additive can be included as part of a new perforating gun. When the perforating gun detonates, the additive is disbursed into the completion brine fluid already present in an annulus of the wellbore. For example, the new perforating gun may include a plurality of shaped charges, one or more containers which include an additive composition comprised of a polyacrylamide additive composition, and a detonating cord connected to the plurality of shaped charges and disposed within each of the containers. Each container is comprised of a cast iron material. In operation, when the brine completion fluid is pumped into the wellbore annulus, a detonation wave conducting in the detonating cord passes through each of the containers. As a result, the plurality of shaped charges will detonate, and the containers will rupture. Since the containers ruptured, the polyacrylamide additive composition from the containers will be disbursed into the brine completion fluid in the annulus. In the alternative, or in addition, each shaped charge may be coated with a lacquer containing the polyacrylamide additive composition. Since the shaped charges are each coated with a lacquer of the polyacrylamide composition, when the shaped charges detonate, the polyacrylamide additive composition in the lacquer coating is disbursed into the brine fluid. Using either of the above methods and apparatus, when the zinc shaped charge debris is mixed with the brine fluid in the wellbore annulus following detonation of the shaped charges, zinc oxychloride hydrate debris is formed as a reaction product; however, the presence of the polyacrylamide additive composition along with the zinc oxychloride hydrate debris in the wellbore annulus will decrease the rate at which such debris is formed into chunks of a hardened cement-like material. The polyacrylamide additive in conjunction with the zinc perforation charge debris has two principal effects: (1) the morphology of the debris is altered in that a gravel-like material is formed; the resulting decrease in surface area slows the reaction rate at which the zinc charge debris is formed into the zinc oxychloride hardened cement like material; and (2) when the zinc chrarge debris does harden, its texture is unconsolidated and granular; consequently, it should be more easily dislodged from the tool. As a result, when a subsequent attempt is made to remove the debris from the annulus, since the debris is now comprised of unconsolidated particles, the debris will easily circulate out of the annulus and through the other well tools without fouling the other well tools suspending from the tubing in the wellbore.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figures 1, 2:
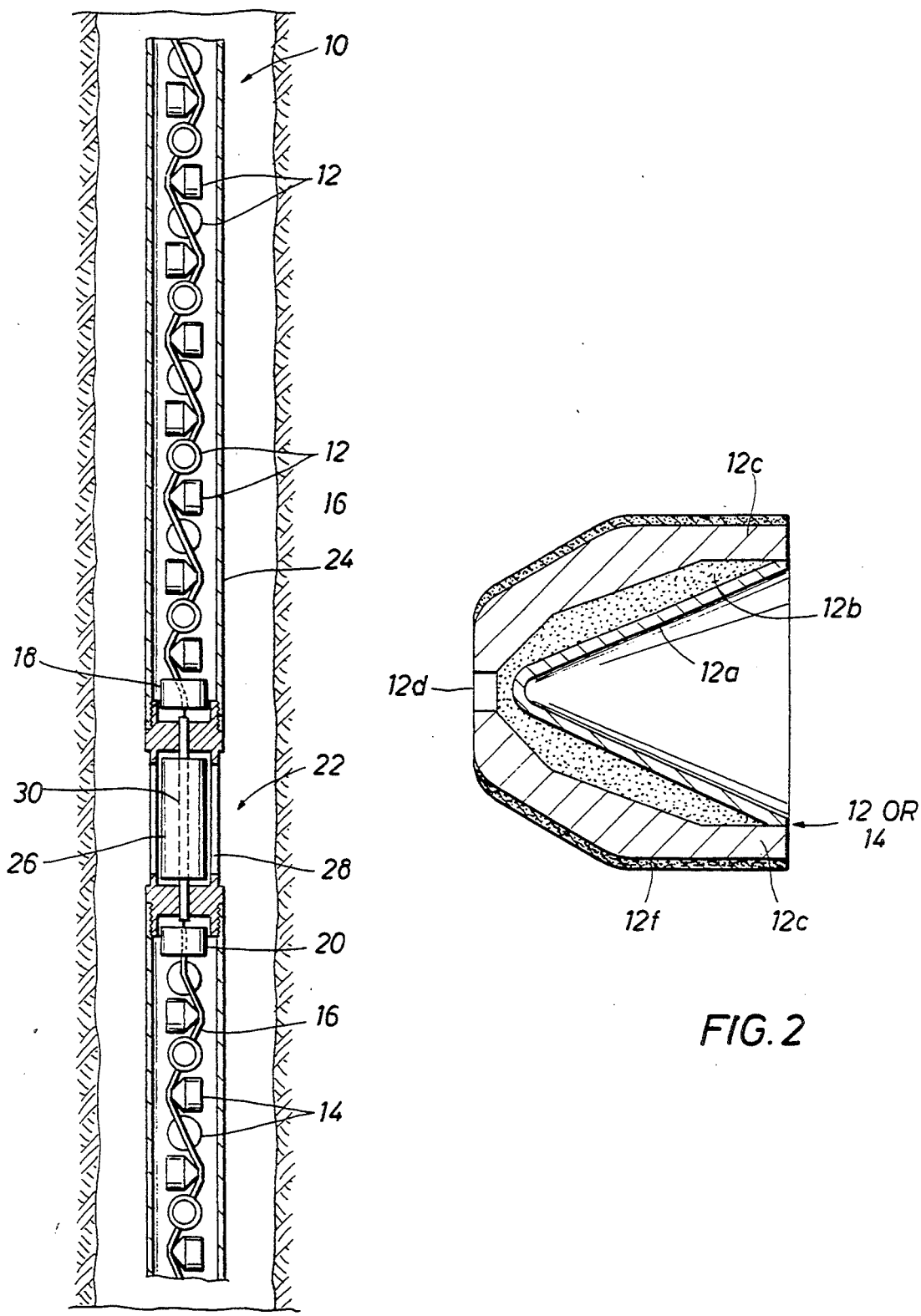
FIG. 1 illustrates a perforating gun in accordance with one embodiment of the present invention including containers designed to rupture and disburse the additive polyacrylamide composition into the wellbore annulus and a plurality of shaped charges, where, in the alternative or in addition, each shaped charge may include a lacquer coating which is comprised of the polyacrylamide additive composition.
FIG. 2 illustrates one of the plurality of shaped charges, the shaped charge including the lacquer coating comprised of the polyacrylamide additive composition.

A perforating gun, including a plurality of zinc perforation shaped charges, is disposed in a wellbore, and an annulus is formed between the perforating gun and a wall of the wellbore. Calcium chloride brine completion fluid is pumped into the annulus. When the perforating gun detonates, the zinc perforation shaped charges are detonated and the resultant zinc charge debris mixes with the calcium chloride brine fluid. As a result of the mixing of the zinc perforation charge debris with the brine fluid, zinc oxychloride hydrate debris is the reaction product and this reaction product resides in the annulus within the wellbore. The perforating gun suspends from a tubing string in the wellbore. The tubing string includes a circulating valve and a plurality of other well tools. If the circulating valve fails, and the zinc oxychloride hydrate debris is not circulated quickly out of the annulus, the zinc oxychloride hydrate debris becomes a hardened cement-like material which is difficult to remove from the wellbore annulus and can foul the other well tools of the tubing string.

In accordance with one embodiment of the present invention, the formation of the hardened cement-like material in the annulus can be delayed by mixing an additive of polyacrylamide with the completion brine fluid prior to pumping the brine fluid and additive into the annulus and detonating the perforating gun. The polyacrylamide additive is mixed with the completion brine fluid in tanks at the wellbore surface prior pumping the brine fluid and additive into the annulus of the wellbore. Later, when a perforating gun detonates in the wellbore, zinc perforation charge debris from the gun is disbursed into the wellbore. Polyacrylamide is a flocculant which causes the zinc perforation charge debris to coagulate. This process reduces the effective surface area of the zinc charge debris thereby inhibiting the conversion of the zinc charge debris into the zinc oxychloride hydrate which is the substance that eventually forms into the hardened cement like material. More particularly, the polyacrylamide additive in conjunction with the zinc perforation charge debris in the wellbore fluid has two principle effects: (1) the morphology of the zinc charge debris is altered in that a gravel-like material is formed; the resulting decrease in surface area slows the reaction rate at which the zinc charge debris is formed into the zinc oxychloride hardened cement like material; and (2) when the zinc charge debris does harden, its texture is unconsolidated and granular. Consequently, when the perforating gun disposed within the wellbore detonates, the polyacrylamide additive composition present in the brine fluid in the annulus decreases the rate at which the zinc perforation charge debris and the calcium chloride brine is formed into the zinc oxychloride hardened cement-like material. In addition, the debris assumes an unconsolidated texture. As a result, there are no large chunks of hardened material in the annulus to foul the other well tools of the tubing string.

In accordance with another embodiment of the present invention, the polyacrylamide additive composition can be included as part of the perforating gun itself. When the perforating gun detonates, the polyacrylamide additive is disbursed into the brine completion fluid located in the annulus. For example, the perforating gun may include one or more containers containing the polyacrylamide additive which rupture when the perforating gun detonates, or the shaped charges in the perforating gun may be coated with a lacquer containing the polyacrylamide additive which is disbursed into the brine fluid when the shaped charges detonate. As a result, the polyacrylamide additive need not be mixed with the brine completion fluid prior to pumping the brine into the wellbore annulus.

Referring to FIG. 1, a new perforating gun in accordance with the present invention, which includes the polyacrylamide additive composition of the present invention, is illustrated.

In FIG. 1, a perforating gun 10 includes a first plurality of shaped charges 12, a second plurality of shaped charges 14, and a detonating cord 16 interconnecting each of the shaped charges. A first sealed container 18 is located in the upper part of the perforating gun 10 in association with the first plurality of shaped charges 12. In addition, or in lieu of the first sealed container 18, a second sealed container 20 is located in the lower part of the perforating gun 10 in association with the second plurality of shaped charges 14. The detonating cord 16 passes through the center of the first sealed container 18 and the second sealed container 20. The polyacrylamide additive composition is sealed within the first and second containers 18 and 20. Assuming that both containers 18 and 20 are used, since the detonating cord 16 is adapted for conducting a detonation wave, when the detonation wave, conducting in the detonating cord 16, passes through the first and second sealed containers 18 and 20, the containers 18 and 20 will rupture thereby causing the polyacrylamide additive composition in the containers 18 and 20 to disburse among the first and second plurality of shaped charges 12 and 14 of the perforating gun. After the charges detonate, a plurality of holes will appear in the gun carrier 24. Well fluids will enter the perforating gun through the plurality of holes in the carrier 24. As a result, when the well fluids enter the perforating gun 10, the polyacrylamide additive from the ruptured containers 18 and 20 will mix with the brine fluids entering the perforating gun from the annulus 22. The polyacrylamide additive will decrease the rate at which a hardened zinc oxychloride hydrate debris is formed when the well fluid brine enters the gun. As a result, the other well tools which are located above the perforating gun 10 in the wellbore will not be fouled by the hardened cement like material.

In addition or in lieu of either one or both of the containers 18 and 20, in FIG. 1, a pressure compensated container 26 may be located between the first and second sealed containers 18 and 20. The pressure compensated container 26 also includes the polyacrylamide additive composition sealed therein. The perforating gun carrier 24 includes a plurality of slots 28 disposed on both sides of the pressure compensated container 26. A frangible tube 30 made of a cast iron material is located within the pressure compensated container 26, and the detonating cord 16 is disposed within an interior space of the frangible tube 30. When the detonation wave in the detonating cord 16 passes through the frangible tube 30, the frangible tube 30 expands and shatters. The expansion of the tube 30 causes the pressure compensated container 26 to shatter. When the container 26 shatters, the polyacrylamide additive composition in the container 26 is disbursed through the slots 28 of carrier 24 and into the annulus 22 in the wellbore. The polyacrylamide composition will mix with the brine fluid disposed within the annulus 22 and will decrease the rate of the formation of a hardened zinc oxychloride hydrate cement like material in the annulus.

Referring to FIG. 2, one of the shaped charges 12 or 14 of FIG. 1 is illustrated.

In FIG. 2, each shaped charge 12 or 14 includes a liner 12a enclosing a primary explosive 12b, the primary explosive 12b being enclosed by a shaped charge case 12c. A secondary explosive pellet 12d is located at the bottom of the shaped charge case 12c. However, in accordance with one aspect of the present invention, in addition, or in lieu of either one, two, or all of the containers 18, 20, and 26 of FIG. 1, the case 12c of each shaped charge 12 and 14 is coated with a lacquer 12f which includes the polyacrylamide additive composition. When the shaped charges 12 and 14 detonate and shatter into a multitude of pieces, the polyacrylamide lacquer coating 12f, deposited on the case 12c of each shaped charge 12 and 14, will mix with the brine fluid disposed within the annulus 22 of the wellbore and will therefore inhibit the formation of a hardened zinc oxychloride hydrate cement like material in the annulus 22.

There are a number of different ways to accomplish the objects of the present invention. For example, when the shaped charges 12 and 14 are not coated with the lacquer 12f containing the polyacrylamide additive composition, the perforating gun of FIG. 1 may include only container 18 containing the additive. On the other hand, the perforating gun of FIG. 1 may include both containers 18 and 20 containing the additive, or it may include both containers 18 and 26 containing the additive, or it may include both containers 20 and 26 containing the additive, or it may include only container 20 containing the additive. On the other hand, when the perforating gun of FIG. 1 does not include any of the containers 18, 26, and 20, the perforating gun of FIG. 1 may instead include shaped charges 12 and 14 which are coated with the lacquer 12f as shown in FIG. 2 that contains the polyacrylamide additive composition.

A functional description of the operation of the present invention will be set forth in the following paragraphs with reference to FIGS. 1 and 2 of the drawings.

Assume for the purposes of this functional description that the perforating gun of FIG. 1 includes the containers 18, 20, and 26 containing the polyacrylamide additive composition, and that the shaped charges 12 and 14 are also coated with the lacquer 12f containing the polyacrylamide additive composition. However, recall that, in order to achieve the objects of the present invention, the perforating gun of FIG. 1 may include shaped charges which are not coated with the lacquer 12f; however, in that event, the perforating gun should include one or more of the containers 18, 20, and 26 which contain the polyacrylamide additive composition. On the other hand, in lieu of these containers, the perforating gun of FIG. 1 should include the shaped charges 12 and/or 14 which are coated with the lacquer 12f containing the Polyacrylamide additive composition.

In operation, in FIGS. 1 and 2, a detonation wave propagates down a detonating cord 16 detonating the shaped charges 12. Since the charges 12 are coated with a lacquer 12f of a polyacrylamide additive, when the charges 12 detonate, the debris from the charges 12, and the accompanying polyacrylamide additive coating on the debris, will mix with the brine fluid in the annulus 22 and will tend to prevent the formation of the hardened zinc oxychloride hydrate cement like material in the annulus 22. In addition, the detonation wave in detonating cord 16 will pass through the sealed container 18 and will rupture the sealed container 18. The polyacrylamide additive inside the sealed container 18 will disburse when the sealed container 18 ruptures and, as a result, the polyacrylamide additive will mix with the well fluid which is entering the holes in the carrier 24 of perforating gun from the annulus 22. The detonation wave in detonating cord 16 will pass through the frangible tube 30. Since the tube 30 is made of a cast iron material, the tube 30 will expand and shatter. The expansion of tube 30 will shatter the pressure compensated container 26. Since the polyacrylamide additive is disposed within the container 26, when the container 26 shatters, the polyacrylamide additive will disburse through the slots 28 through the carrier 24 of the perforating gun 10 and into the annulus 22. As noted earlier, when the polyacrylamide additive mixes with the brine fluid in the annulus 22, the additive will inhibit the formation of the hardened zinc oxychloride hydrate cement like material in the annulus 22. In addition, the detonation wave in detonating cord 16 will pass through the sealed container 20 and will rupture the sealed container 20. Since the polyacrylamide additive is located within the sealed container 20, when the container 20 ruptures, the polyacrylamide additive will mix with the shaped charges 14. When the detonation wave in the detonating cord 16 detonates the shaped charges 14, the polyacrylamide additive will mix with the well fluid entering the perforating gun adjacent the detonated charges 14 through the holes in the carrier 24 thereby inhibiting the formation of the hardened zinc oxychloride hydrate cement like material in the gun. In addition, recall that the shaped charges 14 are coated with a lacquer 12f of the polyacrylamide additive composition. When the charges 14 detonate, the charges 14 will shatter producing debris, and this debris is coated with the lacquer 12f of the polyacrylamide additive composition. The polyacrylamide will mix with the brine fluid in the annulus 22 and inhibit the formation of the hardened zinc oxychloride hydrate cement like material in the annulus 22. Consequently, since a hardened material is not formed in the annulus 22, the other well tools (which form a part of the tubing string to which the perforating gun 10 of FIG. 1 is connected) will not be fouled by the aforementioned hardened cement like material.

The following working examples are provided. These working examples prove that the polyacrylamide additive, when mixed with the brine fluid in the annulus 22, will inhibit the formation of the hardened zinc oxychloride hydrate cement like material.

WORKING EXAMPLE 1

Eight ounce glass jars with plastic caps were used as containers for the initial laboratory experiments. One hundred milliliters of 10.4 lb/gal (1.24 g/cm$^3$) CaCl$_2$ brine were placed into a jar, and a quantity of debris roughly equivalent to 40 grams of zinc was added. There were four debris combinations: (1) 40 g zinc dust; (2) 30 g zinc dust with 12.4 g zinc oxide; (3) 40 g zinc shaped charge debris; and (4) 30 g zinc charge debris with 12.4 g zinc oxide. The tests were run as duplicates in sets of four. The jars were capped and shaken to fully disburse the solids in the brine. The jars were then topped off with new #9 mineral oil, recapped and placed into a high temperature, high pressure autoclave. The autoclave was heated to 400 degrees F. (204 degrees C.) and pressurized to 6000 psi (42 MPa). The autoclave was maintained at that temperature for 24 hours, whereupon the autoclave was cooled and the sample removed. The mineral oil and supernatant brine were decanted. After recording the appearance of the debris, the jars were placed into an oven for drying. Two drying conditions were employed: under nitrogen to simulate the oxygen deficient downhole environment, and under atmospheric conditions to maximize the difficulty of the test with an oxygenated environment. Generally, the materials were dry after 16 hours, but in some instances, it was necessary to increase the amount of time required to fully dry the test sample. After the drying was complete, the strength and appearance of the debris were assessed. Control systems containing no additives in the brine were not set upon curing in the autoclave; however, when allowed to dry in the oven, the samples developed significant compressive strength. When the brine contained two percent (2%) of a 0.25% solution of polyacrylamide, the texture of the debris was unconsolidated and granular upon curing in the autoclave. When the samples dried in the oven, the debris consisted of very fine particles with little compressive strength.

WORKING EXAMPLE 2

A control brine containing no additive and a test brine containing two percent (2%) of a 0.25% solution of polyacrylamide were placed in separate bombs with zinc-metal charges. The charges were detonated, and the bombs were allowed to cool for two days. The pressure was relieved and the bombs opened. The debris in the control brine was unconsolidated upon opening. Hydrogen gas continued to be liberated at a significant rate, as shipping containers containing the debris pressurized and leaked. When dried, the debris had formed large chunks with very low compressive strength. The color of the debris was light gray. The debris in the test brine was also unconsolidated upon opening the bomb. Continued liberation of hydrogen gas did not occur. The shipping containers did not become pressurized. When dried, the debris was unconsolidated with essentially no compressive strength. The color of the debris was black.

In accordance with another embodiment of the present invention, prior to pumping the completion brine into the wellbore annulus, two percent (2%) of a 0.25% solution of polyacrylamide is blended into the brine fluid. The blending would most probably be performed in tanks at the wellsite. The treated brine can stay in the well indefinitely before perforation by a perforating gun. Although no equivalents to polyacrylamide have been proven, possible equivalents include polyalkylpolyamine (PAPA), polyethyleneimine, and poly DADMAC. The preferred operating ranges are: temperature—ambient to 350 degrees F.; and concentration—one percent (1%) to ten percent (10%) of a 0.25% solution of polyacrylamide. Above 350 degrees F., the polyacrylamide is unstable upon long exposure. At concentrations below one percent (1%), the set inhibiting effect of the polyacrylamide is compromised. At concentrations above ten percent (10%), the viscosity of the brine begins to increase. When polyacrylamide is present in the brine fluid in the annulus, the zinc charge debris flocculates and assumes a granular texture. When dry, the material is unconsolidated with very low compressive strength. The process of the present invention, involving adding polyacrylamide to the brine fluid in a wellbore annulus, prevents the formation of hard chunks of zinc oxychloride cement when zinc charge debris is dried in the presence of calcium chloride brine. Therefore, when the polyacrylamide is added to the brine fluid in a wellbore annulus, if a valve failure prevents immediate circulation of the debris in the annulus following perforation, the danger of fouling other well tool of the tubing string and damage to the earth formation is minimized.

WORKING EXAMPLE 3

It would be desirable to develop a polyacrylamide concentrate to add to the brine fluid prior to detonating the perforating gun. The procedure discussed above involved adding a water solution additive, which is prepared from solid polyacrylamide, to the brine fluid in the wellbore. Since polyacrylamide dissolves slowly, the following tests determine that a polyacrylamide emulsion works equally as well. An emulsion would greatly simplify the production of a polyacrylamide concentrate.

A 0.6% solution of the emulsion in 10.5 lb/gal calcium chloride brine was prepared. Using the test procedure set forth above in Working Example 1 of this specification, 40 g of zinc dust was added to each of three four ounce jars containing 100 mL of 10.5 lb/gal calcium brine. One brine was a control with no additives present, one contained 2 mL of 0.6% polyacrylamide emulsion, and the other contained 0.25% Polyacrylamide solution as described in Working Example 1 above. When added to the brines containing Polyacrylamide, the zinc dust flocculated but, in both cases, the texture was not as coarse as had been observed during earlier work. The size of the flocculated particles was much smaller, allowing the solid material to associate more intimately. After drying in the oven, the set products were weaker than the control, but the difference was not as great as had been observed during the earlier work. It must now be determined what caused the different behavior. It was subsequently determined that, by increasing the concentration of polyacrylamide and adding a "surfactant", the granularity of the zinc charge debris not only improved, but also the compressive strength of the set product was also reduced, such that one could crumble it by hand. The above referenced "surfactant" was a blend of coco-trimethyl ammonium chloride and bis (2-hydroxyethyl) coco-amine oxide. To better quantify this effect, small cylinders of the product were cured in 60 mL syringes. Once set, a band saw was used to carefully cut the plastic away from the product. The products were then crushed on a hydraulic press to measure the compressive strength. The results are shown below. For purposes of this table, the term "Polyacrylamide" is abbreviated by the term "Poly", and the above mentioned "surfactant" is abbreviated by the term "Surf":

| Brine Additives | Crushing Force (psi) |
|---|---|
| none (control) | 230 |
| 60 gal/Mgal Poly soln | 220 |
| 20 gal/Mgal Poly soln + 2 gal/Mgal Surf | 130 |
| 40 gal/Mgal Poly soln + 2 gal/Mgal Surf | 140 |
| 60 gal/Mgal Poly soln + 2 gal/Mgal Surf | 45 |

A polyacrylamide solution concentration of 60 gal/Mgal corresponds to 6 mL of the 0.25% solution in 100 mL of brine.

This Polyacrylamide/Surfactant combination [the combination being the Polyacrylamide solution plus the blend of Surfactant which is Coco-Trimethyl Ammonium Chloride and bis (2-hydroxyethyl) Coco-amine Oxide] represents a much improved brine additive. With the original formulation, we relied upon the morphological change of the debris. The unconsolidated hardened material was weaker only because the granular particles did not bond together. The new formulation causes a similar morphological change in the debris, but has the added benefit of dramatically lowering the compressive strength of the hardened material. Thus, even if the material fails to assume a granular texture, the hardened product will still be weak.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of delaying a formation of a hardened cement like material in a brine fluid disposed in a wellbore when a zinc debris is disbursed into said brine fluid, comprising the steps of:
   disbursing said zinc debris into said brine fluid; and
   mixing a solution of polyacrylamide with said brine fluid and said zinc debris.

2. The method of claim 1, wherein the mixing step occurs simultaneously with the disbursing step, the mixing step further including the step of:
   mixing a surfactant with said solution of polyacrylamide, said brine fluid, and said zinc debris.

3. The method of claim 1, wherein the mixing step occurs after the disbursing step, the mixing step further including the step of:
   mixing a surfactant with said solution of polyacrylamide, said brine fluid, and said zinc debris.

4. The method of claim 1, wherein a perforating gun suspends from a tubing string within said brine fluid in said wellbore, said perforating gun including one or more shaped charges comprised of zinc, and wherein the disbursing step comprises the step of:
   detonating each of said shaped charges in said perforating gun, said zinc debris being formed in response to the detonation of said each of said shaped charges; and
   disbursing said zinc debris resultant from the detonation of the shaped charges into said brine fluid.

5. The method of claim 4, wherein said perforating gun includes a container adapted to shatter in response to the detonating step, said container including a solution of polyacrylamide, and wherein the mixing step comprises the step of:
   shattering said container in response to the detonating step; and
   mixing said solution of polyacrylamide disposed within said container with said brine fluid and said zinc debris following the shattering step.

6. The method of claim 4, wherein each of said shaped charges of said perforating gun include a coating of a lacquer containing polyacrylamide, and wherein the mixing step comprises the step of:
   mixing said polyacrylamide disposed in the lacquer coating on each of said shaped charges with said brine fluid and said zinc debris when said shaped charges detonate in response to the detonating step.

7. The method of claim 6, wherein said perforating gun includes a container adapted to shatter in response to the detonating step, said container including a solution of polyacrylamide, and wherein the mixing step comprises the step of:

shattering said container in response to the detonating step; and mixing said solution of polyacrylamide disposed within said container and said polyacrylamide disposed in said lacquer with said brine fluid and said zinc debris following the detonating step and the shattering step.

8. A perforating gun adapted to be disposed in a wellbore containing a brine fluid, comprising:

a shaped charge connected to a detonating cord and adapted to detonate when a detonation wave propagates within said detonating cord; and storage means for storing a solution of polyacrylamide and for disbursing said solution of polyacrylamide into said brine fluid when said shaped charge detonates.

9. The perforating gun of claim 8, wherein said storage means comprises a container connected to said detonating cord and storing said solution of polyacrylamide, said container shattering and disbursing said solution of polyacrylamide into said brine fluid when said detonation wave propagates within said detonating cord.

10. The perforating gun of claim 8, wherein said storage means comprises a coating of a lacquer containing a polyacrylamide disposed on said shaped charge, said polyacrylamide in said lacquer being disbursed into said brine fluid when said shaped charge detonates.

11. A shaped charge, comprising:

a case; and a coating disposed over said case, said coating including an additive comprising a polyacrylamide composition.

12. The shaped charge of claim 11, wherein said coating further includes a surfactant.

13. The shaped charge of claim 12, wherein said surfactant includes coco-trimethyl ammonium chloride and bis (2-hydroxyethyl) coco-amine oxide.

14. A method of delaying a formation of a hardened cement like material in a brine completion fluid disposed in a wellbore, comprising the steps of:

mixing a solution of polyacrylamide with the brine completion fluid at a surface of the wellbore;

following the mixing step, pumping the mixed solution of said polyacrylamide and said brine completion fluid into said wellbore; and when said mixed solution is pumped into said wellbore, further mixing a charge debris with said mixed solution in said wellbore, said mixed solution delaying said formation of said hardened cement like material in the brine fluid.

15. A method of delaying a formation of a hardened cement like material in a brine fluid disposed in a wellbore when a charge debris is disbursed into said brine fluid, comprising the steps of:

disbursing said charge debris into said brine fluid; and mixing a solution of polyacrylamide with said brine fluid and said charge debris.

16. The method of claim 15, wherein the mixing step occurs simultaneously with the disbursing step, the mixing step further including the step of:

mixing a surfactant with said solution of polyacrylamide, said brine fluid, and said charge debris.

17. The method of claim 15, wherein the mixing step occurs after the disbursing step, the mixing step further including the step of:

mixing a surfactant with said solution of polyacrylamide, said brine fluid, and said charge debris.

18. A wellbore apparatus adapted to be disposed in a wellbore containing a brine fluid, comprising:

a charge adapted to detonate; and a storage apparatus adapted for storing a solution of polyacrylamide and for disbursing said solution of polyacrylamide into said brine fluid when said charge detonates.

19. The wellbore apparatus of claim 18, wherein said storage apparatus comprises a container for storing said solution of polyacrylamide, said container shattering and disbursing said solution of polyacrylamide into said brine fluid when said charge detonates.

20. The wellbore apparatus of claim 18, wherein said storage apparatus comprises a coating of a lacquer containing a polyacrylamide disposed on said charge, said polyacrylamide in said lacquer being disbursed into said brine fluid when said charge detonates.

21. The wellbore apparatus of claim 20, wherein said storage apparatus comprises a container for storing said solution of polyacrylamide, said container shattering and disbursing said solution of polyacrylamide into said brine fluid when said charge detonates.

* * * * *